Sept. 7, 1948.  F. D. DALE  2,448,662
POWER TAKEOFF
Filed Jan. 25, 1945  3 Sheets-Sheet 1
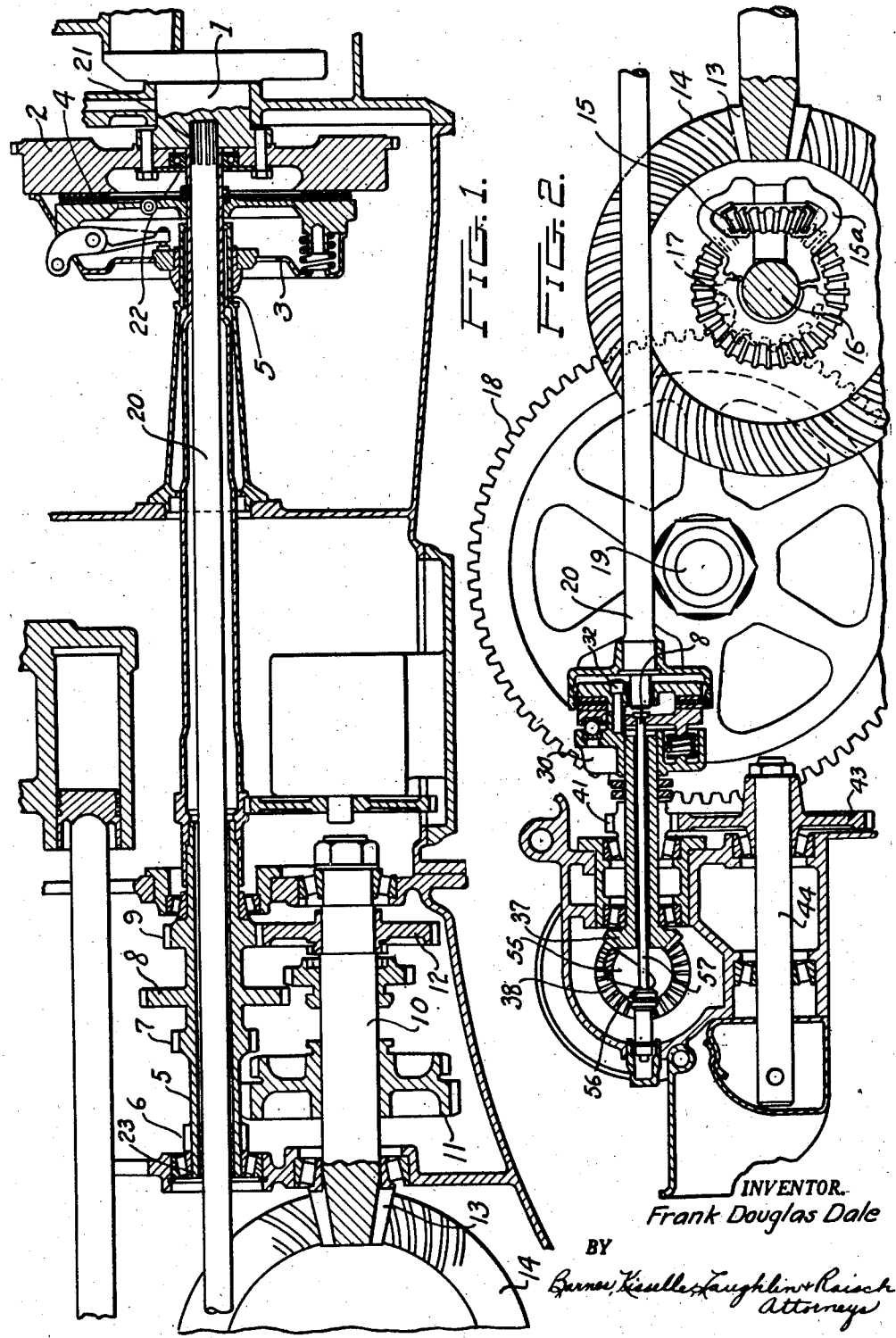
INVENTOR.
Frank Douglas Dale
BY
*Burns, Kiselle, Laughlin & Raisch*
Attorneys

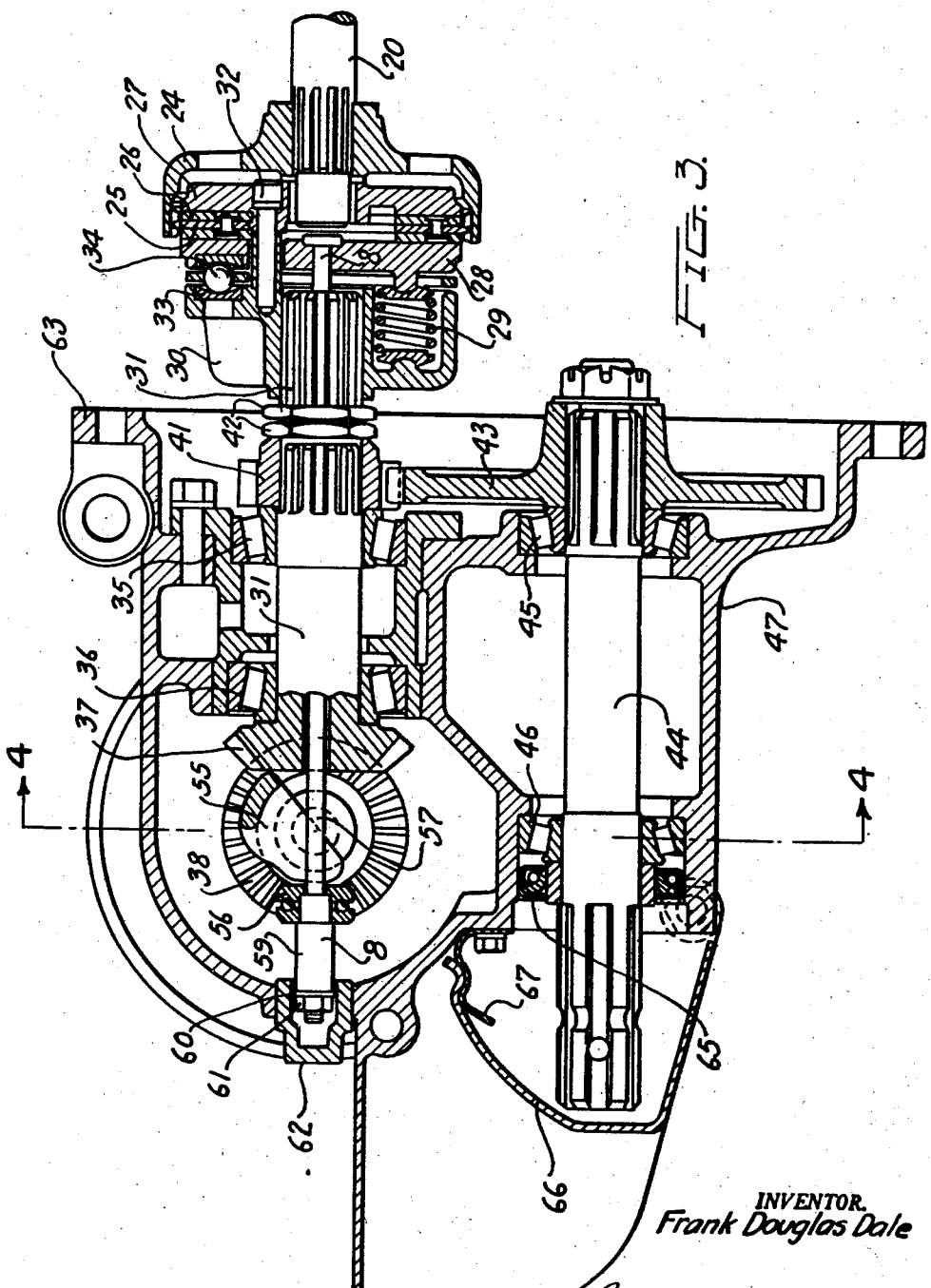

Patented Sept. 7, 1948

2,448,662

UNITED STATES PATENT OFFICE 2,448,662

POWER TAKEOFF

Frank Douglas Dale, Coldwater, Kans., assignor to Harry Ferguson, Inc., Dearborn, Mich., a corporation of Delaware Application January 25, 1945, Serial No. 574,530

6 Claims. (Cl. 74—11)

This invention relates to power-take-offs for use with tractors.

Various designs of power-take-offs with tractors including power-take-offs operated by a shaft connected with the crank shaft and passing through the hollow transmission shaft have been proposed. However, many of these power-take-off designs are undesirable because they have the control members so designed that the operating members are mounted upon the transmission case of the tractor. This is undesirable because some of the tractors may be manufactured and sold with a power-take-off. It is an object of the present invention to provide an improved unitary assembly having a supporting housing adapted to be bolted to the transmission case and supporting all of the elements of the power-take-off unit. These elements include means for connecting the constantly running driving shaft of the tractor with the driven shaft in the power-take-off unit through a control clutch on the unit, the driving connections to a side pulley and a rearwardly extending take-off shaft, and the clutch control mechanism. In the preferred embodiment the latter includes a control rod extending axially through the driven shaft of the take-off assembly.

Other objects and advantages of the invention will become apparent from the following detailed description taken in connection with the accompanying drawings in which:

Fig. 1 is a longitudinal section showing the front part of the transmission case including the transmission gears, the clutch and the fly wheel of a tractor provided with my improvement.

Fig. 2 is a similar view showing the gears at the rear of the transmission case and my improved power-take-off assembly in place.

Fig. 3 is a longitudinal section through the power-take-off housing showing the power-take-off mechanism contained therein and the associated clutch.

Figure 4:
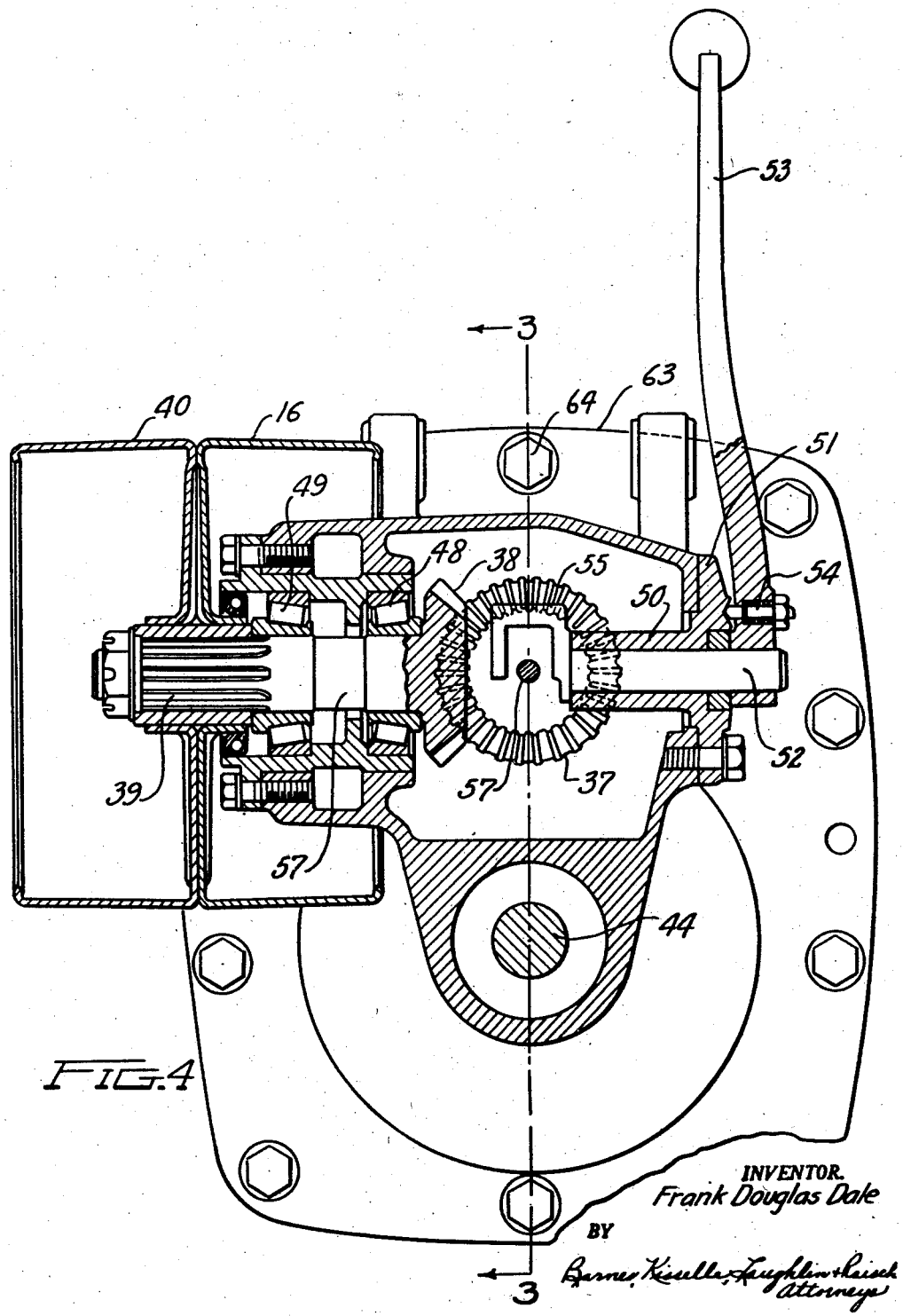
Fig. 4 is a cross-section through the same along line 4—4 of Fig. 3.

Power is derived from the engine crank shaft 1 mounting a fly wheel 2 which is provided with a conventional clutch 3. The clutch includes a driven disc 4 which is secured to a hollow transmission shaft 5. This hollow transmission shaft extends rearwardly and has fixed thereon driving gears 6, 7, 8 and 9. A driven shaft 10 carries slidably mounted driven gears 11 and 12 which can be shifted to produce the desired gear ratio. At the end of the driven shaft 10 is a spiral-toothed pinion 13 which meshes with a spiral ring gear 14 of the differential. A differential pinion 15 is journalled in a yoke or pinion housing 15a which is driven by ring gear 14 and is fast to an output shaft 16. Mounted for rotation with shaft 16 is a spur gear 17 which meshes with a large driven gear 18 attached to an axle section 19. The axle section carries on its end one of the rear traction wheels of the tractor. This is a tractor transmission in which the differential does not connect directly with the two rear axle shafts, but connects with them by means of reduction gearing on each side of the differential. However, so far as my improvement is concerned, the conventional differential with the direct connection with the rear axles could be used.

Supported inside of the transmission shaft 5 is a propeller shaft 20 which is splined into the end of the crank shaft at 21. The propeller shaft is supported in the same bearing 22 that supports the transmission shaft in the fly wheel 2 and is also supported in a roller bearing 23 which supports the rear end of the transmission shaft 5. The splined rear end of the propeller shaft 20 projects out of the compartment that houses the transmission gears and into the differential compartment, as shown in Figs. 1 and 2.

Referring to Fig. 3, there is slipped onto the splined rear end of the propeller shaft 20 a self-energizing clutch. This has a clutch housing 24 which carries a driving disc 25 which is provided with the usual clutch facings 26. On the inside of the housing is the driven disc 27 and on the outside of the housing, the driven disc 28. The disc 28 is urged forward against the driving disc 25 by means of the light springs 29. A housing 30 carrying the driven members is splined on the end of the shaft 31. Disc 27 is kept firmly clamped to the housing 30 by means of the cap screws 32. The rear face of the disc 28 and the front face of the housing 30 are provided with aligned dished recesses 33 receiving between them balls 34. Springs 29 cause the initial engagement of the driven discs 27 and 28 with the driving disc 25. Initial drag causes the recesses on the faces of the housing 33 to shift slightly out of alignment as the disc 28 picks up the load of the driven housing 30. This causes the discs 25, 27, 28 to be tightly packed together by the wedging action of the balls on the tapered walls of the recesses. This is a well-known form of self-energizing clutch which makes it possible to use relatively light packing springs whose function is simply to give the initial engagement between the driving and the driven plates, after which the wedging devices operated by the torque securely pack the discs together to carry the heavy load. This clutch is assembled with a tight fit upon the intermediate power-take-off shaft 31 so it can be shipped as a part of the power-take-off unit assembly. When the unit is about to be bolted in place, the driving housing hub, which is splined, is slid over the splined end of the propeller shaft and then the housing unit is bolted to the end of the transmission case.

Intermediate shaft 31 is supported in roller bearings 35 and 36. On the end of the shaft 31 is a beveled gear 37 which meshes with beveled gear 38 (Fig. 2) which is on the end of a pulley shaft 39 (Fig. 4). The pulley shaft carries a belt pulley 40 which may be provided with a belt (not shown) to drive any desired machinery.

There is splined on the shaft 31 a spur gear 41 held in place by a jamb nut 42. This gear meshes with a large spur gear 43 which is splined on the forward end of a power-take-off shaft 44. This shaft is supported in roller bearings 45 and 46. Roller bearings 35, 36, 45 and 46 are supported in the power-take-off housing 47 which is a casting provided with the necessary bearing seats and also provided with seats to seat the roller bearings 48 and 49 that support the pulley shaft 39. This casting has partition walls, etc., to provide the necessary compartments.

A journal bearing 50 (Fig. 4) is provided in a cover plate 51 and this supports cam shaft 52 on the outer end of which is a hand lever 53 provided with a spring-operated detent 54 that engages in recesses in the cover plate to hold the lever in position. On the end of the cam shaft is a cam or eccentric 55 adapted to contact the thrust collar in the form of a ball bearing 56 mounted on the end of a control rod 57 and concentric therewith. When this lever is turned counterclockwise (Fig. 3), this pulls rearwardly on the rod 57 which extends forwardly through the intermediate power-take-off shaft 31, as shown in Fig. 2. The thrust collar 56 bears against sleeve 59 which, together with a washer 60, is retained on the rod 57 by nut 61. Adjustment for release of the clutch may be had with this nut. Washer 60 is guided in the hollow plug 62 which is fitted into the end of the power-take-off housing.

When the clutch control rod 57 is drawn to the rear by turning down the lever 53, this pulls on driven disc 28, compresses spring 29 of the clutch and also pulls the balls 34 down into the bottom of the two dished recesses and thereby lining up the recesses. This releases the driving discs from the driven disc and releases the clutch. It will be noted that the operating lever and the cam are located in the housing that carries the power-take-off unit so that all these parts are a unitary assembly located in the housing. This housing can be bolted to the rear of the transmission casing of the tractor by bolts 64 passing through the flange 63. The power-take-off shaft 44 projects from the end of the housing through an opening at the bearing 46, which opening is provided with a dust seal 65. The end of the shaft is splined to receive a universal joint or other drive connection for operating a piece of machinery. This machinery quite often consists of a tractor drawn implement. The end of the shaft 44, when not in use, is covered by a hood 66 which can be snapped in place over spring clip 67.

The location of the clutch in the system enables both power-take-off shafts to be engaged by only its clutch and one operating lever. Thus both power-take-off shafts will be driven when the clutch is thrown in, one shaft working and the other shaft running idly. This results in no inconvenience, however, since it is rarely necessary to use both power-take-off shafts at the same time.

What I claim is:

1. A power-take-off unit assembly for use on tractors with a transmission case having an opening at the rear end and provided with a rearwardly extending propeller shaft which is directly connected with the crank shaft and independent of the tractor transmission shaft and clutch, said assembly comprising a housing boltable to said open rear end, a power-take-off shaft supported in said housing and carrying on its end and arranged to be supported upon and driven by the end of the propeller shaft a second clutch provided with driving and driven members, means for affording packing pressure to the members and means for releasing said packing means, said means including connections passing longitudinally through the said power-take-off shaft and devices by which said connections may be operated to release the clutch.

2. A power-take-off unit assembly for use on tractors with a transmission case having an opening at the rear end and provided with a rearwardly extending propeller shaft which is directly connected with the crank shaft and independent of the tractor transmission shaft and clutch, said assembly comprising a housing boltable to said open rear end, a power-take-off shaft supported in said housing and carrying on its end and arranged to be supported upon and driven by the end of the propeller shaft a second clutch provided with driving and driven members, means for affording packing pressure to the members and means for releasing said packing means, said means including a rod passing longitudinally through the said power-take-off shaft and devices by which said rod may be operated to release the clutch.

3. A power-take-off unit assembly for use on tractors with a transmission case having an opening at the rear end and provided with a rearwardly extending propeller shaft and which is directly connected with the crank shaft and independent of the tractor transmission shaft and clutch, said assembly comprising a housing boltable to said open rear end, a power-take-off shaft supported in said housing and carrying on its end and arranged to be supported upon and driven by the end of the propeller shaft a second clutch provided with driving and driven members, means for affording packing pressure to the members and means for releasing said packing means, said means including connections passing longitudinally through the said power-take-off shaft and a lever and crank arm by which said connections may be operated rearwardly to release the clutch.

4. A power-take-off unit assembly for use on tractors with a transmission case having an opening at the rear end and provided with a rearwardly extending propeller shaft and which is directly connected with the crank shaft and independent of the tractor transmission shaft and clutch, said assembly comprising a housing boltable to said open rear end, a power-take-off shaft supported in said housing and carrying on its end and arranged to be supported upon and driven by the end of the propeller shaft a second clutch provided with driving and driven members, means for affording packing pressure to the members and means for releasing said packing means, said means including a rod provided with a thrust collar and passing longitudinally through the said power-take-off shaft and a lever and cam operating on said rod and the thrust collar on the rod by which said rod may be pulled rearwardly to release the clutch.

5. A power-take-off unit assembly for use on tractors with a transmission case having an opening at the rear end and provided with a rearwardly extending propeller shaft which is directly connected with the crank shaft and independent of the tractor transmission shaft and clutch, said assembly comprising a housing boltable to said open rear end, a power-take-off shaft supported in said housing to project coaxially toward said propeller shaft at its front end and carrying power output means at its rear end, a second clutch provided with driving and driven discs and arranged to interconnect the opposed ends of said shafts, means for affording packing pressure to the discs, means located wholly in and upon the housing by which the clutch discs may be released, a pinion on the power-take-off shaft between said front and rear ends thereof, a second power-take-off shaft supported in the housing and a gear thereon in mesh with the said pinion.

6. A self-contained power takeoff unit, comprising, a housing, a longitudinal operating shaft journaled in said housing, a transverse shaft journaled in said housing rearwardly and to one side of said operating shaft, gearing connecting said operating shaft and said transverse shaft, a belt pulley on the outer end of said transverse shaft, a power takeoff shaft extending parallel with said operating shaft journaled in said housing and having one end extending rearwardly therefrom, said operating shaft having its forward end extending forwardly from said housing, a clutch element mounted upon the forward end of said operating shaft, a second clutch element cooperating with said first clutch element, resilient means normally urging said clutch elements into driving relationship, means on said second clutch element to engage a drive shaft, clutch actuating means comprising a rod slidably and axially mounted in said operating shaft and extending rearwardly thereof, a second transverse shaft journaled in said housing and having a cam at its inner end adapted to engage said rod and retract said rod longitudinally to disengage said clutch elements, and an external operating handle on the outer end of said second transverse shaft.

FRANK DOUGLAS DALE.

REFERENCES CITED

The following references are of record in the file of this patent:

UNITED STATES PATENTS

| Number | Name | Date |
| --- | --- | --- |
| 2,140,687 | Brown | Dec. 20, 1938 |
| 2,230,520 | Wemp | Feb. 4, 1941 |
| 2,317,957 | Frudden | Apr. 27, 1943 |
| 2,349,880 | Orelind | May 30, 1944 |